United States Patent [19]
Wolfersberger et al.

[11] Patent Number: 5,164,793
[45] Date of Patent: Nov. 17, 1992

[54] SHOE SIZE SELECTION SYSTEM AND APPARATUS THEREFOR

[75] Inventors: Charles Wolfersberger, Ferguson; Mark D. Linneman, St. Louis County, both of Mo.

[73] Assignee: Brown Group, Inc., St. Louis, Mo.

[21] Appl. No.: 761,173

[22] Filed: Sep. 13, 1991

[51] Int. Cl.⁵ ............................................. G01B 11/24
[52] U.S. Cl. ..................... 356/376; 33/3 R; 33/6; 33/515
[58] Field of Search ............... 356/376; 33/3 R, 3 A, 33/3 B, 3 C, 6, 515; 12/146 L, 142 N

[56] References Cited

U.S. PATENT DOCUMENTS

| | | | |
|---|---|---|---|
| 4,294,014 | 10/1981 | Baumann et al. | 33/3 C |
| 4,538,353 | 9/1985 | Gardner | 33/3 C |
| 4,604,807 | 8/1986 | Bock et al. | 33/3 C |
| 4,745,290 | 5/1988 | Frankel et al. | 356/376 |
| 5,025,476 | 6/1991 | Gould et al. | 356/374 |

FOREIGN PATENT DOCUMENTS

| | | | |
|---|---|---|---|
| 14022 | 8/1980 | European Pat. Off. | 33/3 C |
| 277918 | 11/1988 | Japan | 33/3 R |
| 1480799 | 5/1989 | U.S.S.R. | 33/3 C |
| 1489181 | 10/1977 | United Kingdom | 33/3 C |

*Primary Examiner*—F. L. Evans
*Attorney, Agent, or Firm*—Polster, Lieder, Woodruff & Lucchesi

[57] ABSTRACT

A shoe size selection system using a foot image to obtain measurement information in three dimensions leading to a proper shoe size recommendation. The system provides a computer program that interprets three-dimensional information about a foot and calculates the key features that relate foot length and girth data that affect the comfort and fit of a shoe. Apparatus is used to allow the computer to reproduce on a viewing screen the results of a scan of a foot and to indicate on a chart a preferred shoe size for a foot that may be normal as to physical form or abnormal as to physical form.

10 Claims, 8 Drawing Sheets

FIG. 3.
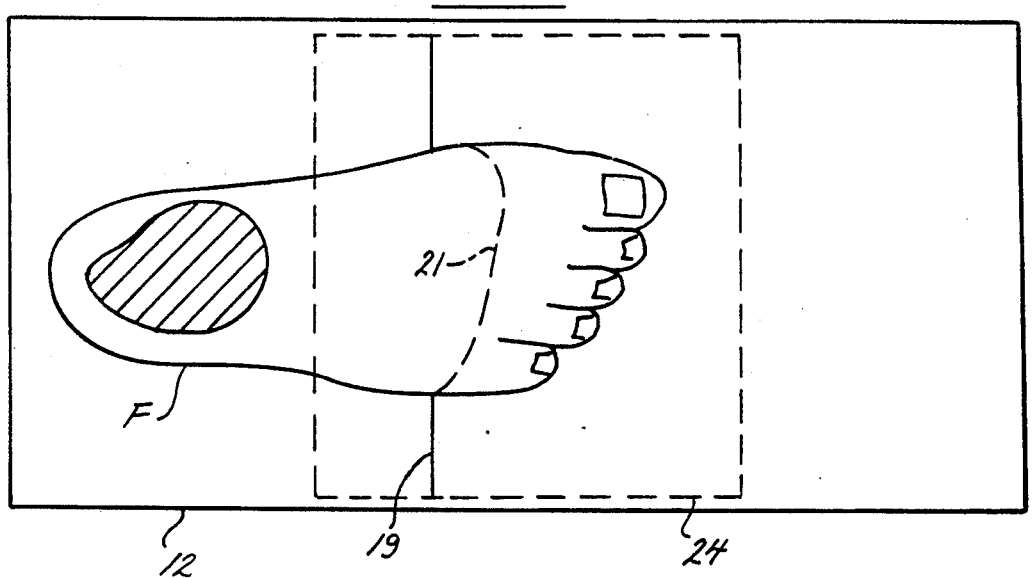
FIG. 4A.
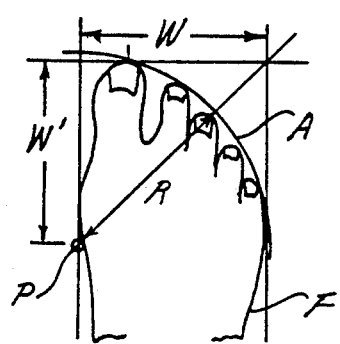
FIG. 4B.
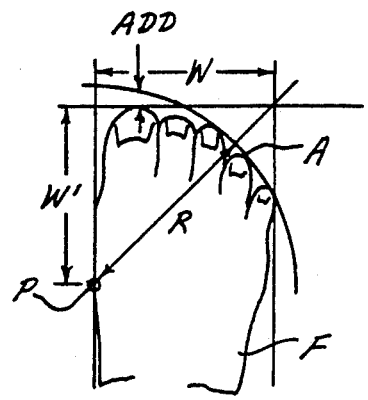
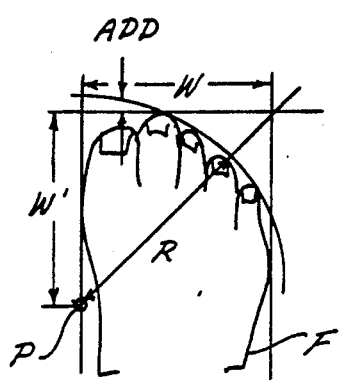
FIG. 4C.

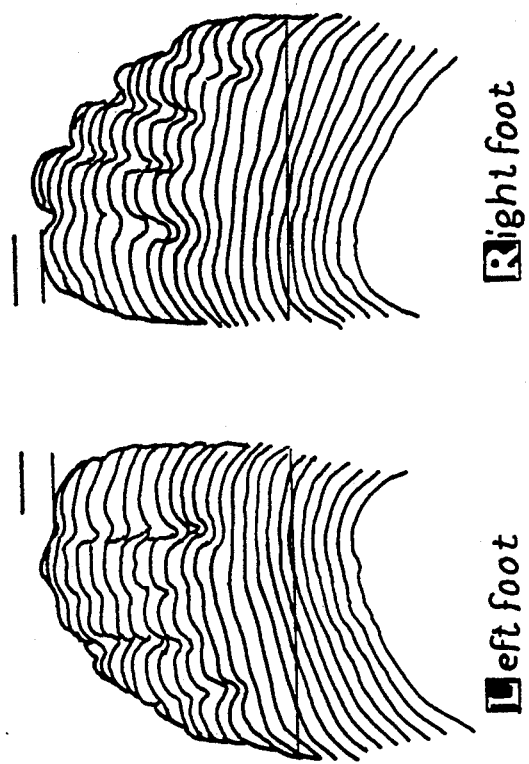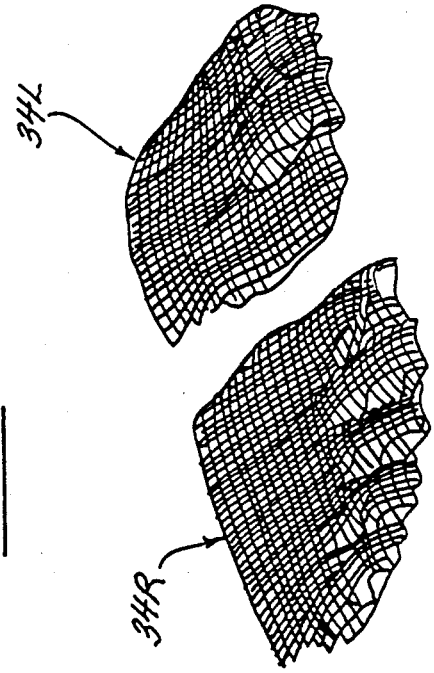
FIG. 11.
RANGE ① 7C
RANGE ② 7½B
RANGE ③ 7½C

SHOE SIZE SELECTION SYSTEM AND APPARATUS THEREFOR

BACKGROUND OF THE INVENTION

1. Field of the Invention

The invention is directed to a system for shoe size selection and apparatus for obtaining three dimensional measurements of feet so that improved fit of shoes may result, as well as applying foot measuring technique to improve the shoe last design.

2. Description of the Prior Art

Shoe stores, when called upon to determine a customer's shoe size, use a foot measuring scale known as a Brannock device. This measures the length of the foot as well as its width, and thus enables the salesperson to select a pair of shoes which approximate the correct size. While the Brannock device makes reasonably accurate measurement of length, its measurements for the width are of far less precision.

With increasing quantities of shoes entering the marketplace from outside the domestic area, there has been a problem of the sizing and fit of shoes such as foreign sizing versus domestic sizing where the foreign N, M, W width availability contrasts with the broader domestic selections ranging from 4A to 3E. The sizing method of foot measuring is not solved by the prior Brannock devices which are the most used standard for foot measuring. The Brannock devices have been around for years, and consist of a metal baseplate with a couple of sliding scales and graduation. The measurement obtained is two-dimensional in nature indicating absolute toe length, reach from heel to ball and absolute width. Thus, the older foot measuring procedures do not provide improved accuracy because the sliding width scale on the Brannock device does not guarantee correspondence between width and girth and length.

Even measurements of length alone may require compensation, depending on whether one has a heel with a flat generally bony surface or a heel with a pad of flesh projecting rearwardly. The former requires a somewhat longer shoe than measured on the Brannock device, whereas the latter requires a shorter shoe. Moreover, the arrangement of one's toes affect the length. For example, if the toes are generally squared off, a longer shoe is required than with toes that taper sharply downwardly from the large toe.

BRIEF SUMMARY OF THE INVENTION

The foot measuring apparatus of the subject invention takes all these factors into consideration and depicts a proper shoe size, while giving two alternative sizes that are perhaps just as acceptable depending on the type of shoe and the preference of fit.

It has been found that people have feet presenting many and varied heel and toe shapes that affect the measurement obtained when using standard devices. To get a more accurate measurement, a special fixture plate has been developed to hold the foot and, most importantly, the heel in the proper location for measurement. The fixture plate is intended to be mounted at a 30 degree angle to the floor for the purpose of forcing the heel to engage a specially designed heel rest to locate the heel so measurement of the length will be independent of heel shape.

An important object of the invention resides in a system for measuring feet in three dimensions, rather than just two, by the use of a camera, a laser light source with a suitable lens, and a computer with appropriate software routines. These routines analyze the foot's toe shape and girth profile so that abnormalities can be detected, and the shoe sizing can be adjusted. The three dimensional measurement will then guarantee correspondence between foot length, foot width, foot thickness and the most appropriate shoe size.

Other objects reside in the selection of apparatus that will aid in the examination of feet to obtain a size for a shoe which is both proper for the characteristics of a foot and comfortable to wear.

BRIEF DESCRIPTION OF THE DRAWINGS

The subject matter of the invention is illustrated in the accompanying drawings, wherein;

FIG. 3 is a fragmentary plan view, as seen by a camera, of a foot showing the laser light contour across the ball of the foot;

FIGS. 4A, 4B and 4C are plan views of toe configuration having angle shape, block shape and Morton's toe respectively;

FIG. 11 is a diagramatic size printout produced by the apparatus of FIG. 1; and

DETAILED DESCRIPTION OF THE APPARATUS

Figure 1:
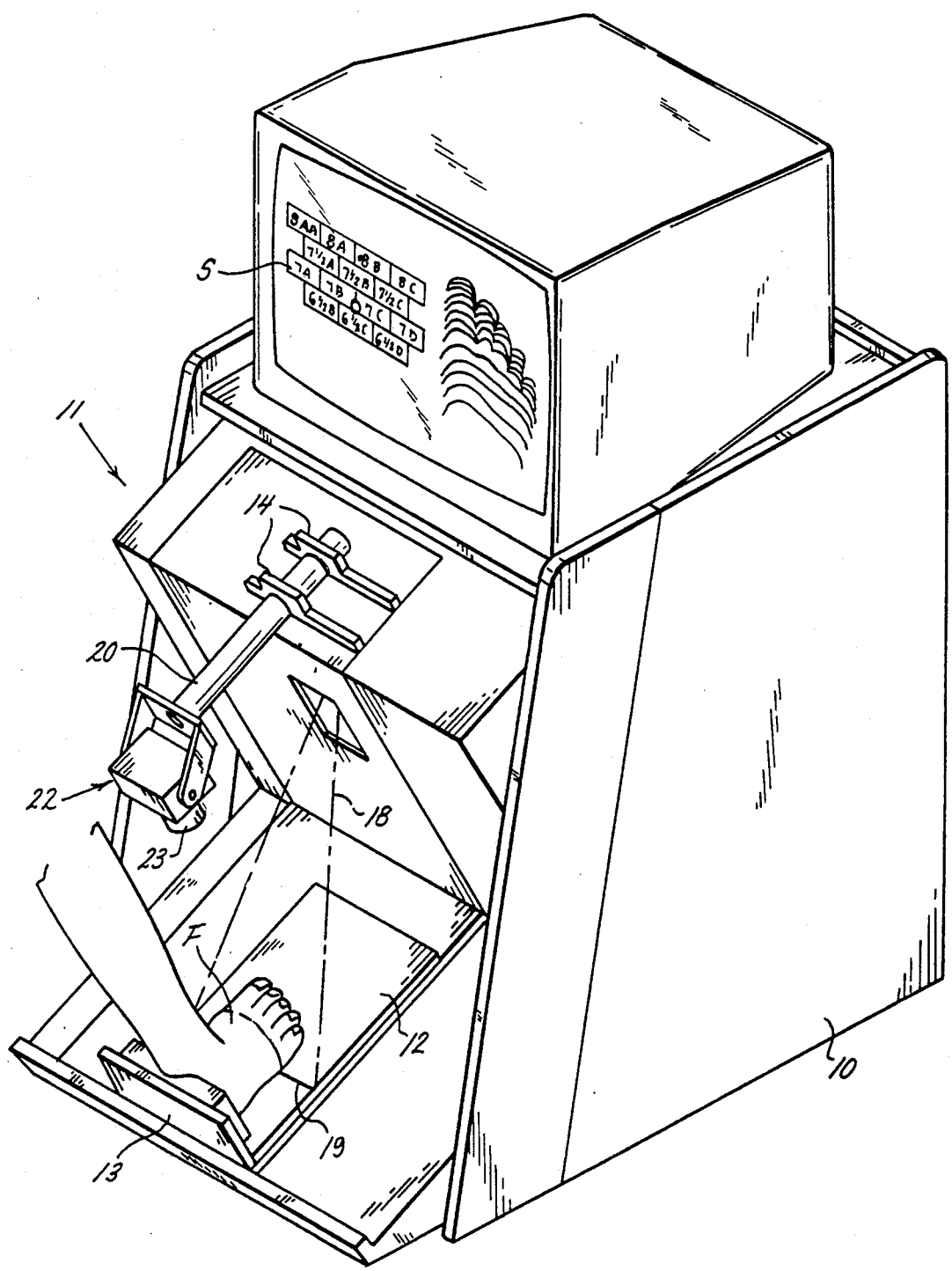
FIG. 1 is an isometric view of apparatus for developing a picture of a foot placed in the field of view of the apparatus.
Figure 2:
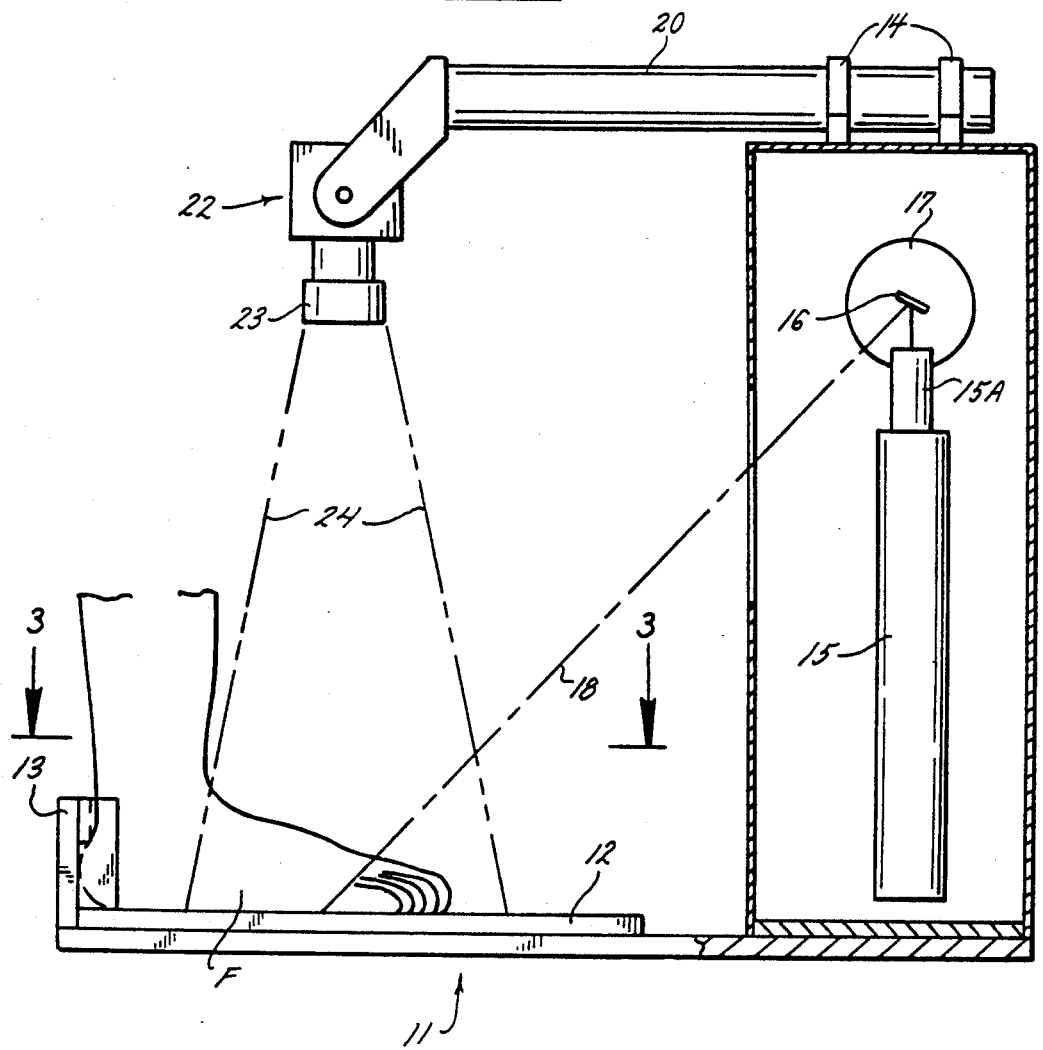
FIG. 2 is a diagramatic side elevation of the apparatus seen in FIG. 1.

A preferred embodiment of the apparatus of the subject invention is represented in FIGS. 1 and 2 by a foot sizing console 10 which houses a foot imager assembly 11 having a platform within the viewing area which supports a plate 12 on which a foot F is intended to be supported. The plate 12 is provided with a heel stop or heel receiving locator 13. The foot imager assembly 11 includes a laser light generator means 15 which upon being stimulated produces a point light source that is picked up by a cylindrical lens 15A (FIG. 2) which spreads the laser beam so a reflecting mirror 16 can project the beam. The mirror 16 is operatively associated with a motor means 17 which directs the laser beam 18 down towards plate 12. That beam when it impinges on the plate 12 (see FIG. 3) forms a straight line, which appears as a line 19, except that when a foot F is on the plate 12, the beam will follow the contour and shape of the foot F, as is seen at dotted line 21.

The assembly 11 includes an arm 20 fastened at means 14 in position to project out to a position where a camera 22 is located so its lens barrel 23 is directed substantially vertically down to focus on the top area of the foot F within the viewing limits of the camera represented by the dotted outline 24 seen in FIG. 3.

Figure 12:
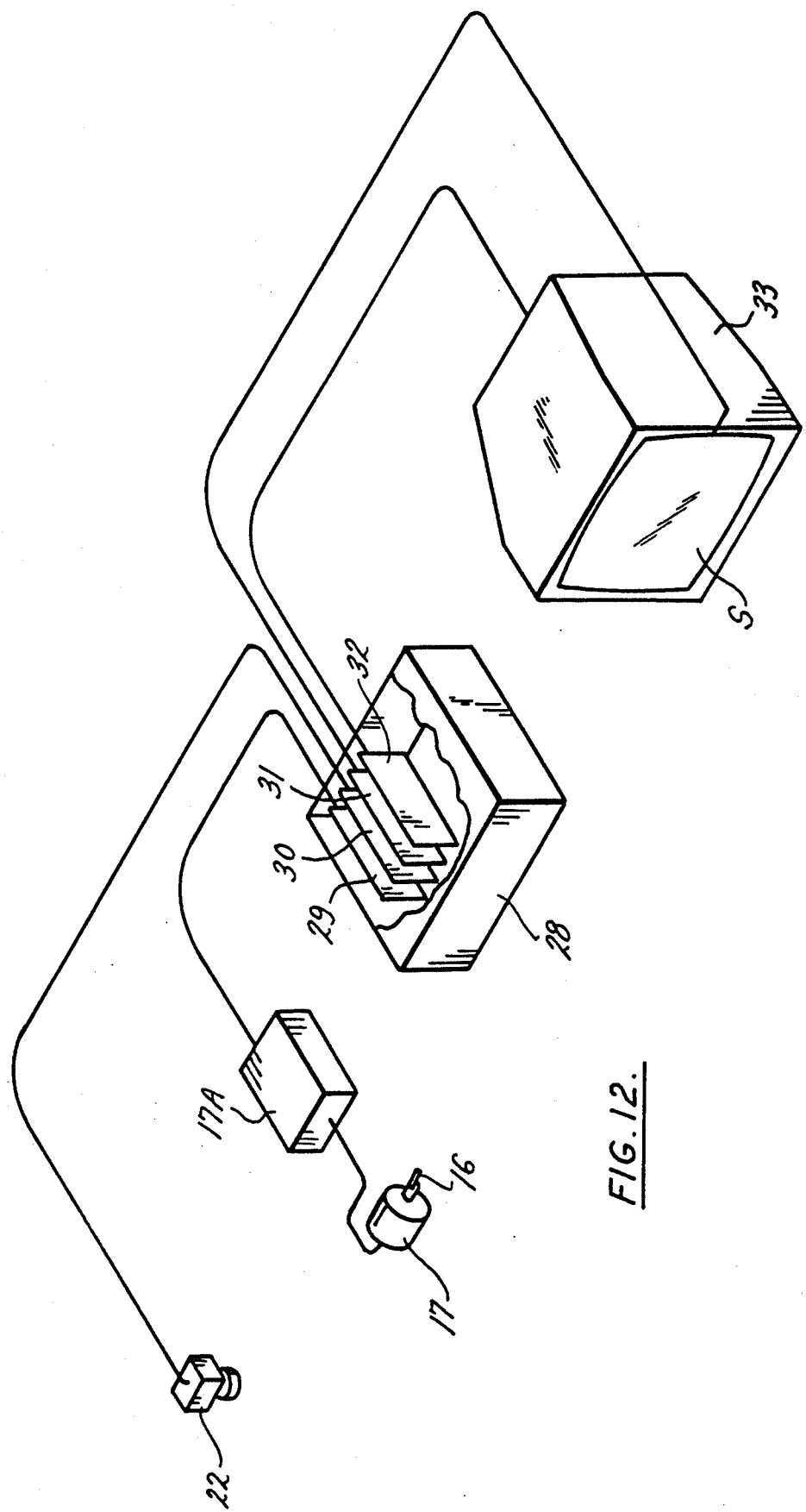
FIG. 12 is a circuit diagram for controlling the operation of the apparatus of FIG. 1.

FIG. 12 illustrates diagrammatically the components in the imager assembly 11. That assembly includes the camera 22, the stepping motor 17 and its drive 17A, a computer 28 which is provided with a motor indexer board 29, frame grabber board 30, touch screen controller board 31 and a graphics controller board 32 for the graphics monitor 33 for reproducing the data appearing on the screen.

In making a determination of a shoe size, toe shape (FIGS. 4A, 4B and 4C) must be considered. Toe shape refers to the shape of a two dimensional outline of the forepart of a foot as seen in a plan view. If a foot has a toe shape which resembles the space inside the forepart of a typical shoe, as in the case of the angle shaped toes in FIG. 4A, then the measured length of the foot serves well to determine the proper shoe size. But if the toe shape is more block shaped as in FIG. 4B, or is characterized by Morton's toe as in FIG. 4C, then additional length must be incorporated into the shoe size so that the smaller toes will not be squeezed unduely.

The amount to be added to the foot length is calculated in the following manner. A point P is located along the rectangular boundary of the foot which is parallel to the lengthwise axis of the foot and which is adjacent to the big toe. The position of P along this boundary is prescribed to be a distance W' away from the front boundary of the foot, where W' is equal to the width W of the foot. An arc A is constructed with its center at P and with the smallest radius R which satisfies the condition that no part of the outline of the toes may lie outside of arc A. A refined foot length is taken to be the measured foot length plus eighty percent of the difference between W' and R.

This refined foot length serves better than the measured foot length in determining shoe size because it takes into account a variety of toe shapes.

Figure 2A:
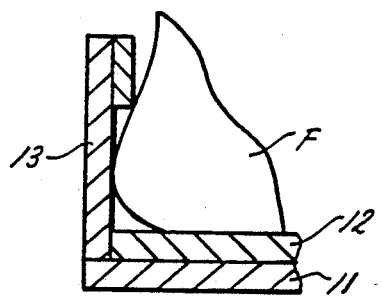
FIGS. 2A and 2B are fragmentary sectional views of the foot support showing how it accommodates fatty and bony heels respectively.
Figure 2B:
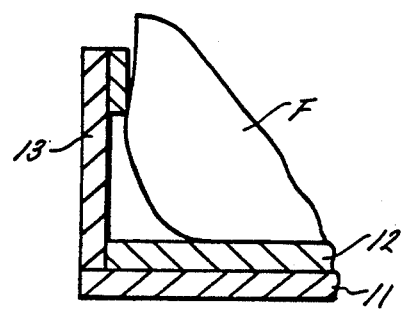

Returning to FIGS. 1, 2A and 2B, there is shown that the assembly 11 is tilted to about an angle of 30° to the horizontal so the foot F can make good contact against the heel stop 13. That contact has been found to cause about one-half of the foot and calf weight to push the heel against the stop or rest 13. It has been found that the heel stop or rest 13, when shaped as seen in FIGS. 2A or 2B compensates for the heel shape when making foot length measurements and yields greater accuracy.

Figures 5, 6:
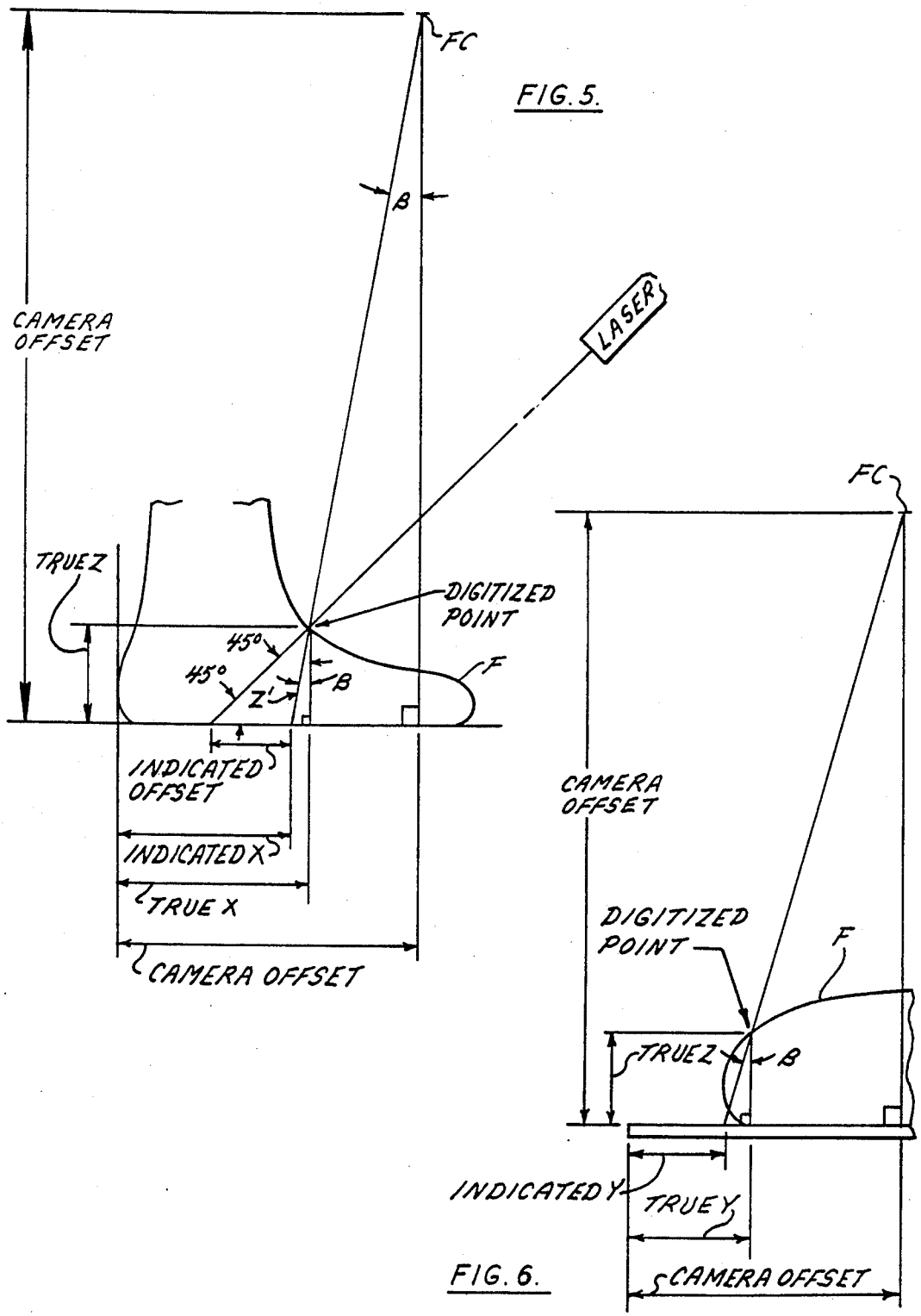
FIG. 5 is a diagram illustrating the mathematical relationship to calculate true X and Z coordinates of a foot.
FIG. 6 is a diagram illustrating the mathematical relationship to calculate the true Y coordinate of a foot.

The computer located in the cabinet 10 is programmed to interpret three-dimensional information about the portion of foot F that is observed by the camera 22 and scanned by the laser beam 18. Calculations to be performed by the computer program are diagrammed in FIG. 5 where the angle of the laser beam 18 must be known, as well as the location of the focal point FC of the camera 22. The true X, Y and Z coordinates are calculated by solving for angles and sides of the triangles illustrated in FIGS. 5 and 6. Performing these calculations repetitively over visible portions of the foot results in a family of three dimensional points used to mathematically describe the forepart of the foot. This foot data is then subject to analysis to determine foot length, foot girth and finally, shoe size.

Figure 7:
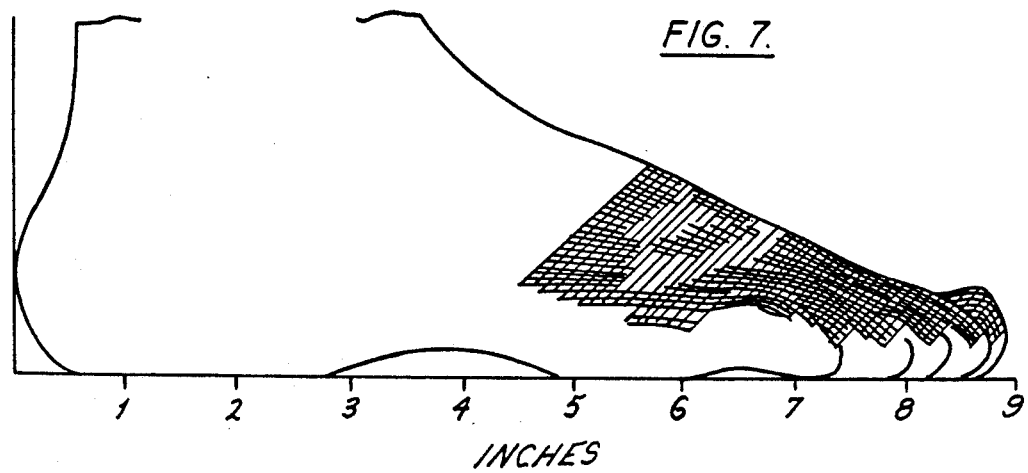
FIG. 7 is a side view of a foot showing the lines drawn between the digitized points produced by the apparatus as it measures a foot.

The side view of FIG. 7 is a rendering showing the portion of a foot that is visible to the camera, and is able to be digitized by the laser/triangulation technique described above. A top view of this portion forms the character of the image reproduced on the screens in FIG. 1.

Figure 8:
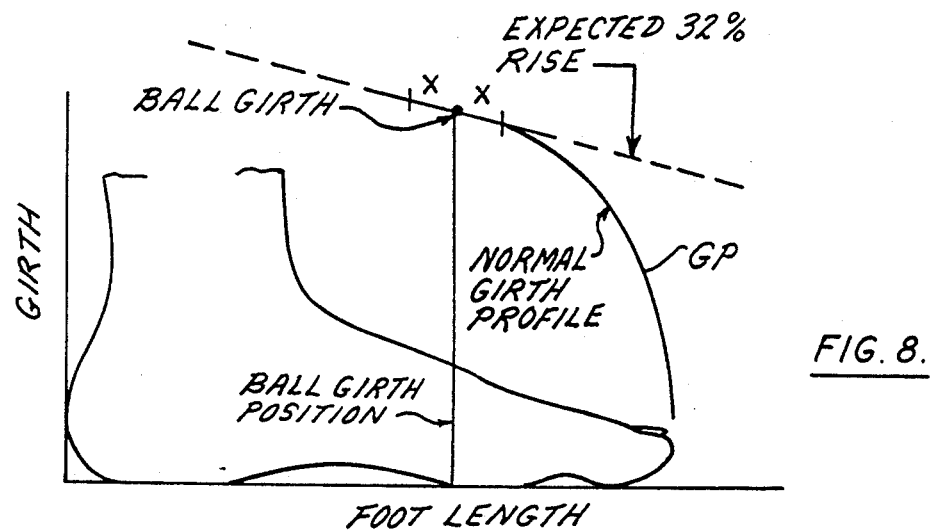
FIG. 8 is a length to girth chart of a foot taken to illustrate a normal girth profile.
Figure 9:
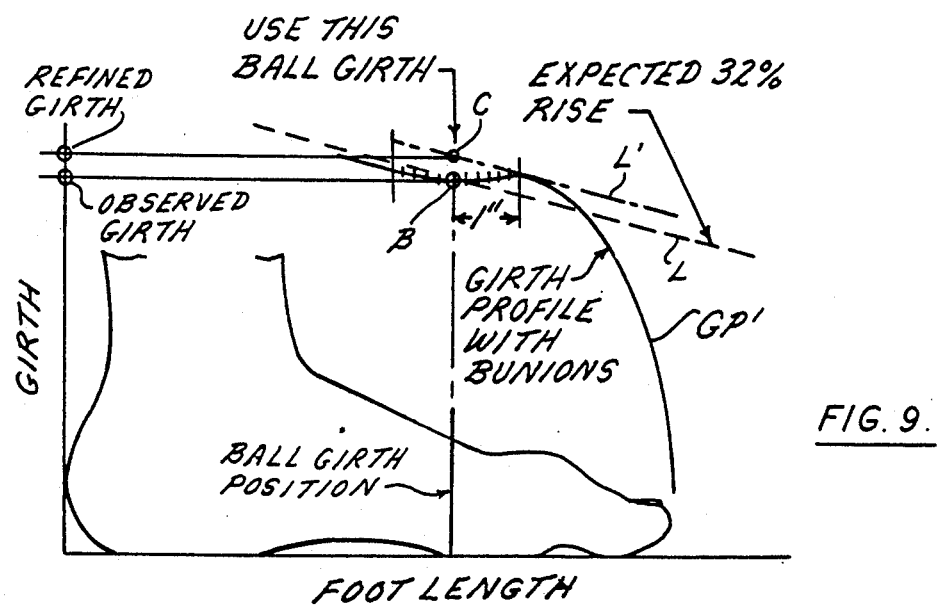
FIG. 9 is a length to girth chart of a foot taken to illustrate an abnormal girth profile.

Further research has revealed that abnormalities in foot shape can cause rejection of shoes of a recommended ball girth dimension. It has been determined from girth measurements that an examination of the overall girth profile of the ball area of the foot can result in improved shoe sizing. The examination of a girth profile begins by looking at the girth about one inch ahead of and behind the normal ball girth location. FIG. 8 illustrates a normal girth profile GP which has a smooth increase in measurement until it levels out at about a 32% rate of increase (or rise) at the ball girth. If, for example, a bunion is present, as in FIG. 9, the ball girth curve GP will show a peak at the location of the bunion. This peak will extend above a line L with a 32% rise passing through point B (the point on the ball girth curve GP at the ball girth position). This suggests that the shoe will be too tight in this area. To alleviate this problem, the computer finds another line L' passing though point C with a 32% rise and located where it is just high enough so that no portion of the ball girth curve is above the line L'. Hence no part of the shoe in this area should be too tight. The refined girth measurement is taken at point C (the point on line L' at the ball girth position).

Figure 10:
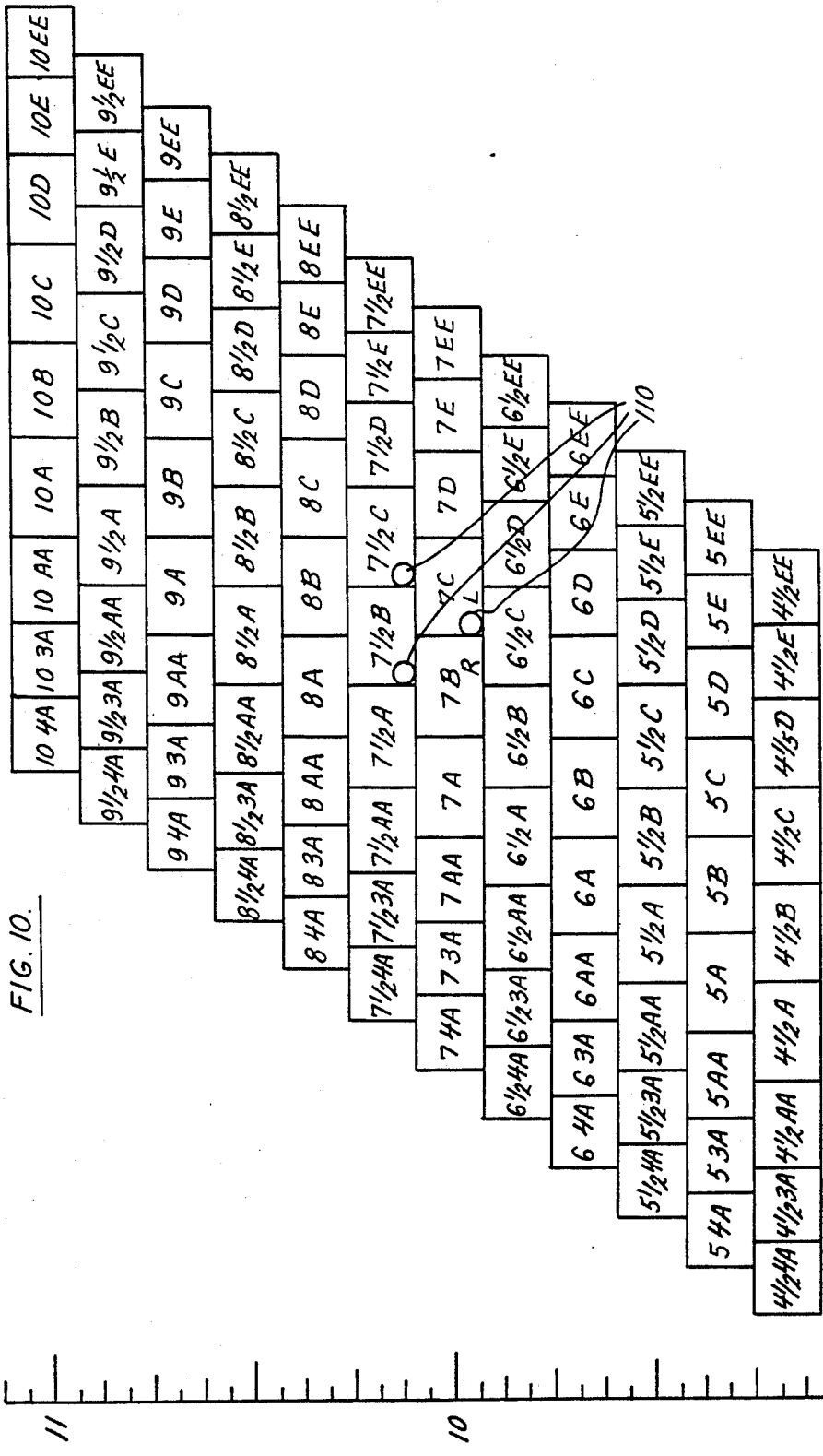
FIG. 10 is a chart embodied in the computer memory relating foot girth and length to women's shoe sizes.

The FIG. 10 chart is provided in the memory of the computer to provide shoe sizing as it relates to foot length in inches and foot girth in inches. The purpose of the chart is to allow the computer to reproduce on the viewing screen S of FIG. 1 the result of the scan of the subject's feet, both right and left. The viewing screen S in FIG. 1, however, displays only the right foot. When a complete sizing of both feet of a subject is completed, the viewing screen S will produce such a picture, as seen in FIG. 11. By touching the screen S, the apparatus will produce a printout of what is seen in FIG. 11. The result of the sizing of both feet includes an isometric view at 34R and 34L. It is also to be understood that the view of FIG. 11 applies to the feet of the subject where circle marks 110 appear on the chart of FIG. 10.

As an example, Ranges appearing in FIG. 11 refer to the characteristics of shoe choices. For example, Range 1 is intended to indicate that the size 7C is the best fit for a high heel shoe. Range 2 indicates the size that is comfortable in a low heel shoe, but if the shoe is to be worn when standing for long periods of time, the Range 3 shoe size will be the most acceptable.

Turning now to FIG. 12, there is shown a control system for the apparatus of FIG. 1. The computer 28 in the console 10 of FIG. 1 is provided with a motor index board 29 for stepping the laser beam motor 17, a video digitizer board 30 for camera 22, the touchscreen control board 31 and a graphics controller board 32 for the viewing monitor 33 having the screen S. Briefly, as the stepper motor 17 moves the mirror 16 to cause the laser beam to scan across a foot F, the camera records the light beam positions as seen in FIG. 7. Those beams are digitized and become part of the graphics on the screen S.

The foregoing specification has set forth a preferred disclosure of apparatus for selecting a shoe size to fit a foot, and a method for practicing the invention. Variations in the apparatus and the method associated with its use may come to mind without departing from the scope of the invention herein.

What is claimed is:

1. A shoe size selection system for determining a size acceptable to the shape of a foot that is intended to wear the shoe, in which the improvement comprises:
    (a) a support to receive a foot to be measured for size;
    (b) a laser light source;
    (c) means to structure and move said laser light for scanning over a foot on said support;
    (d) camera means positioned to view a foot on said support during laser light scanning;
    (e) computer means connected to said laser light source and said camera means to calculate three-dimensional size information about a foot on said support;
    (f) program means in said computer means to compare shoe length and girth with a foot on said support; and
    (g) viewing means connected to said computer means for displaying the calculated three-dimensional size information about a foot on said support.

2. The improvement set forth in claim 1 wherein said support to receive a foot includes heel stop means adapted to compensate for bony and fleshy heels.

3. The improvement set forth in claim 1 wherein said computer means includes routines for analyzing toe shapes to modify the length measurement of the foot.

4. The improvement set forth in claim 1 wherein said computer means includes routines for modifying foot girth measurements upon detection of abnormalities affecting width sizing.

5. In foot measuring apparatus for determining a shoe size that is acceptable to the characteristics of the shape of the foot that is to wear the shoe, the improvement comprising:
    (a) a foot supporting surface having a foot heel backstop for setting the starting position from which the shoe size is to be determined;
    (b) means for scanning the foot while on said foot support surface;
    (c) means for illuminating the foot to activate said scanning means to produce an image of the foot and its shape characteristics;
    (d) computer means for storing a shoe size chart having foot girth and length blocks thereon;
    (e) means in said computer means for reproducing said computer-stored chart, said image of said foot and its shape characteristics and an indication of the girth and length of the foot on said computer-stored chart for visual comparison with said girth and length blocks; and
    (f) means in said computer means to produce a printout graphically indicating a shoe size responsive to the shape of the foot to wear the shoe.

6. A method of selecting a shoe size for a foot having a predetermined shape and length in which the method includes:
    (a) supporting a foot in a pre-determined position to expose its shape and length in two dimensions;
    (b) illuminating the foot to provide a lighted image thereof;
    (c) developing a two-dimensional view of the lighted image;
    (d) subjecting the lighted two dimensional view to triangulation calculations to obtain three-dimensional information which describe the exposed surface of the foot;
    (e) providing a chart relating foot length and girth to a group of representative shoe sizes;
    (f) displaying an image of the foot described by the three-dimensional information thereof; and
    (g) indicating on the chart at least one shoe size to accommodate the foot.

7. The method set forth in claim 6 in which the method supporting a foot accounts for a heel configuration that determines a net length dimension of the foot.

8. The method set forth in claim 6 in which subjecting the lighted image to triangulation calculations accounts for foot width variations used to detect foot abnormalities.

9. The method set forth in claim 6 in which the triangulation calculations to obtain three-dimensional information includes a foot girth profile detection for abnormalities which affect width sizing.

10. In a shoe size determination method, the improvement of:
    (a) providing a software program which relates foot length, width and thickness data to shoe size;
    (b) scanning a foot with a laser beam from a given angular location relative to the foot;
    (c) creating a camera visual image of the foot during the laser beam scanning;
    (d) electronically transmitting the camera created visual image into the software program; and
    (e) producing a size chart of shoe length to girth with the shoe size indicated on the size chart to suit the foot size.

* * * * *